United States Patent [19]

Maki et al.

[11] Patent Number: 4,555,536

[45] Date of Patent: Nov. 26, 1985

[54] ANTI-CORROSIVE COATING COMPOSITION

[75] Inventors: Hirohisa Maki, Neyagawa; Takashi Sano, Kyoto; Misao Yamamoto, Otsu, all of Japan

[73] Assignee: Dai-Ichi Kogyo Seiyaku Co., Ltd., Kyoto, Japan

[21] Appl. No.: 627,580

[22] Filed: Jul. 3, 1984

[30] Foreign Application Priority Data

Jul. 4, 1983 [JP] Japan ................. 58-121916
Jul. 6, 1983 [JP] Japan ................. 58-123633

[51] Int. Cl.$^4$ ............... C08G 18/50; C08G 18/36
[52] U.S. Cl. ..................... 524/66; 525/452; 528/48; 528/74.5; 528/78
[58] Field of Search ............ 528/48, 74.5, 78; 524/66; 525/452

[56] References Cited

U.S. PATENT DOCUMENTS 2,953,533  9/1960  Khawam ............... 528/78
3,143,517  8/1964  Heiss ................. 528/51
3,519,680  7/1970  Wismer et al. ......... 528/78
3,755,215  8/1973  Khoury et al. ......... 528/48
3,846,355 11/1974  Mayer ................. 528/48

Primary Examiner—Herbert S. Cockeram
Attorney, Agent, or Firm—Armstrong, Nikaido, Marmelstein & Kubovcik

[57] ABSTRACT

An anti-corrosive polyurethane coating composition which has excellent anti-corrosive property, water resistance, adhesive property to metals and impact resistance and can be coated thick in one coating operation, comprising (1) a polyol mixture of castor oil or a polyol derived from castor oil and an amine polyol produced by addition reaction of an alkylene oxide to a nitrogen-containing compound having at least 2 active hydrogen atoms such as ammonia, an aliphatic amine or an aromatic amine, the amine polyol having at least 2 hydroxyl groups and a hydroxyl value of at least 150 mgKOH/g, (2) a polyisocyanate compound, and optionally coal tar, an aromatic hydrocarbon oil or resin, or usual paint additives.

4 Claims, No Drawings

ANTI-CORROSIVE COATING COMPOSITION

BACKGROUND OF THE INVENTION

The present invention relates to an anti-corrosive paint, and more particularly to an anti-corrosive polyurethane coating composition which can be applied relatively thick for providing water resisting, corrosion resisting, impact resisting or electrically insulating films.

Hitherto, coal-tar enamels, asphalt and epoxy coal tar paints have been used as anti-corrosive coating compositions. However, they are poor in low temperature characteristics such as curability, brittleness, impact resistance and flexibility. Further, epoxy coal tar paints have a good adhesion property, but have the defects that the coating efficiency and abrasion resistance are bad because the curing time is long and it is hard to coat thick.

Melt coating of polyethylene has also been made for the above purposes. However, it requires a large-scale equipment and is unfit for coating in a small amount. Also, it is difficult to adopt the melt coating onto weld zones and irregular shape portions of steel pipes at the scene of labor.

A main object of the present invention is to eliminate the above-mentioned defects of conventional anti-corrosive coating compositions.

A further object of the present invention is to provide an anti-corrosive coating composition which has excellent corrosion resistance, water resistance and adhesion property to metals and can be applied thick for the purpose of corrosion inhibition, water proofing, formation of impact resistant film or electric insulation.

These and other objects of the present invention will become apparent from the description hereinafter.

SUMMARY OF THE INVENTION

In accordance with the present invention, there is provided an anti-corrosive coating composition comprising a non-foamed polyurethane resin produced by reaction of (1) a polyol component comprising a polyol mixture of (a) a castor oil polyol and (b) an amine polyol produced by addition reaction of an alkylene oxide of the general formula:

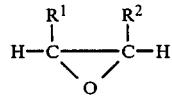

wherein $R^1$ and $R^2$ are hydrogen atom, an alkyl group or an aryl group, provided that at least one of $R^1$ and $R^2$ is hydrogen atom,
to a nitrogen-containing compound having at least 2 active hydrogen atoms, said amine polyol having at least 2 hydroxyl groups and a hydroxyl value of at least 150 mgKOH/g, and (2) a polyisocyanate component comprising a polyisocyanate compound.

DETAILED DESCRIPTION

The anti-corrosive polyurethane coating composition of the present invention is usually prepared into a two-package paint consisting of a polyol composition, namely the polyol component (1), and a polyisocyanate composition, namely the polyisocyanate component (2).

In the present invention, a mixture of a castor oil polyol (a) and an amine polyol (b) is used as a polyol. The castor oil polyol (a) used in the present invention includes, for instance, castor oil, mono- or di-glyceride of castor oil fatty acid and a mixture thereof, polyhydroxyl polyesters such as interesterification products of castor oil and an ethylene oxide, propylene oxide, butylene oxide or styrene oxide adduct of dipropylene glycol, glycerol or trimethylolpropane, an esterification product of ricinoleic acid and an ethylene oxide, propylene oxide, butylene oxide or styrene oxide adduct of dipropylene glycol, glycerol, ricinoleic polyol or trimethylolpropane, and the like.

The amine polyol (b) used in the present invention is a polyol prepared by addition reaction of an alkylene oxide having the above-mentioned general formula to a nitrogen-containing compound having at least 2 active hydrogen atoms. It is essential that the amine polyol has at least 2 hydroxyl groups and a hydroxyl value of not less than 150 mgKOH/g. When the hydroxyl value is less than 150 mgKOH/g, the corrosion inhibiting property is lowered.

Examples of the alkylene oxide used in the present invention are, for instance, ethylene oxide, propylene oxide, butylene oxide and styrene oxide.

Examples of the nitrogen-containing compound are, for instance, ammonia; an aliphatic amine such as methylamine, ethylenediamine or diethylenetriamine; an alicyclic amine such as cyclohexylamine; piperazine; isophoronediamine; an aromatic amine in which an amino group is directly linked to the aromatic ring such as aniline, toluidine, di(methylamino)benzene, aminobenzoic acid, aminophenol, methylaminophenyl, phenylenediamine or bis(aminophenyl)methane; an aromatic amine in which an amino group is indirectly linked to the aromatic ring such as benzylamine: an adduct of an aliphatic amine and styrene oxide or phenyl glycidyl ether; and the like.

The castor oil polyol and the amine polyol can be used in arbitrary ratios. Preferably, they are used so that the weight average hydroxyl value is at least 180 mgKOH/g. Usually, the amine polyol is used in an amount of 5 to 70% by equivalent, especially 10 to 50% by equivalent, based on the whole polyol. When the amount of the amine polyol is more than the above range, the hydrophilic property of the obtained polyurethane is increased and the corrosion inhibiting property tends to become worse.

The polyisocyanate compound used in the present invention includes, for instance, aromatic polyisocyanates, aliphatic polyisocyanates, alicyclic polyisocyanates, and mixtures thereof. Among them, aromatic polyisocyanates such as tolylene diisocyanate (TDI) and diphenylmethane diisocyanate (MDI) are particularly preferable. The polyisocyanate compound is used in an amount such that the ratio of isocyanato group (NCO) to the active hydrogen atom of the polyol is from 0.85 to 1.15:1 by equivalent, preferably 0.90 to 1.10:1 by equivalent.

The coating composition of the present invention may contain coal tar, an aromatic hydrocarbon oil or an aromatic hydrocarbon resin. Various known coal tars can be used in the present invention, e.g. raw tar, road tar, refined tar and anhydrous tar. The coal tar is employed in an amount of 5 to 150% by weight, preferably 10 to 100% by weight, based on the polyurethane resin. When the amount of the coar tar is more than the above range, the corrosion inhibiting property is decreased.

Examples of the aromatic hydrocarbon oil used in the present invention are, for instance, an alkyl-substituted aromatic polycyclic compound such as an alkyldiphenyl or an alkylnaphthalene, an aromatic process oil, and the like. Examples of the aromatic hydrocarbon resin used in the present invention are, for instance, coumarone-indene resin, a $C_9$ petroleum resin, an aromatic hydrocarbon resin obtained from an extract rich in aromaticity with furfural, phenol or a like solvent from a petroleum heavy residue or a petroleum distillate having an average molecular weight of 150 to 850, and an aromatic hydrocarbon resin (commercially available under the commercial name "Fukkol Resin" made by Fujikosan Kabushiki Kaisha) obtained from an extract with furfural, phenol or a like solvent or a cracking distillate obtained at the time of an oxidation treatment of a petroleum with oxygen or air. The aromatic hydrocarbon oil or resin is employed in an amount of 5 to 100% by weight, preferably 10 to 50% by weight, based on the polyurethane resin. When the amount of the aromatic hydrocarbon oil or resin is more than the above range, the corrosion inhibiting property is decreased.

The anti-corrosive polyurethane coating composition of the present invention has excellent corrosion resistance, water resistance and adhesion property to metals and a low moisture and oxygen permeability. These excellent effects are produced by the use of the amine polyol having a hydroxyl value of at least 150 mgKOH/g in combination with the caster oil polyol. In particular, it is considered that the amine polyol has a good compatibility with the castor oil polyol and the use thereof improves the adhesion property of the produced polyurethane resin and decreases the moisture permeability and oxygen permeability of the films.

The anti-corrosive coating composition of the present invention may contain usual paint additives, as occasion demands, such as an inorganic filler, an antifoaming agent, a catalyst, a plasticizer and a solvent. Examples of the inorganic filler are, for instance, calcium carbonate, surface-treated calcium carbonate, talc, silica sand, mica, glass flake, iron oxide, carbon, and the like. Examples of the antifoaming agent are, for instance, synthetic zeolite, quick lime, soluble anhydrous gypsum, and the like. Any catalysts such as tin catalysts and lead catalysts generally used for formation of polyurethane are employed as a catalyst. Examples of the plasticizer are, for instance, phthalic acid esters, benzoic acid esters, adipic acid esters, process oil, liquid petroleum resin, chlorinated paraffin, and the like. Examples of the solvent are, for instance, methylene chloride, toluene, xylene, ethyl acetate, and the like. When it is desired to obtain a coating composition which can be applied thick, it is preferable to use a solvent in as small amounts as possible.

By suitably incorporating additives into the composition of the invention, it is possible to apply the composition with a film thickness of 2 to 3 mm. (dry) by one application procedure and moreover with decreased foaming.

The anti-corrosive coating composition of the invention is applicable for corrosion inhibition to metals such as steel, aluminum, tin and cast iron, for instance, in the form of pipe, tube, rod, plate or can. In case of applying the coating composition to metal plates, it is desirable to conduct surface treatment such as degreasing, derusting or rubbing.

The preparation of the coating composition of the present invention is not limited to a particular process. For instance, there can be adopted a one-shot process in which a polyisocyanate composition (A) and a polyol composition (B) into which additives, coal tar or an aromatic hydrocarbon oil or resin are incorporated, as occasion demands, are admixed in a predetermined ratio, or a prepolymer process in which a part of a polyol is added to a polyisocyanate compound to form a prepolymer composition (A) containing an isocyanate prepolymer, and the composition (A) is admixed with a polyol composition (B) containing the remaining polyol with, if necessary, additives, coal tar or an aromatic hydrocarbon oil or resin, in a predetermined ratio.

The anti-corrosive coating composition of the present invention is useful as anti-corrosive paints for crude oil reserve tank, petroleum tank, steel structures of various plants, sea structures, steel pipe and cast iron pipe, and surface paints of iron board.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

To 100 parts of castor oil fatty acid monoglyceride (hydroxyl value: 127 mgKOH/g) was added 172 parts of liquid diphenylmethane diisocyanate (hereinafter referred to as "MDI"). After causing to react at 90° C. for 1.5 hours in a nitrogen stream, 10 parts of xylene was added to the reaction mixture. The viscosity of the obtained prepolymer composition was 5,000 cP at 25° C., and the amount of the free NCO groups was 15%.

To 152 parts of the prepolymer composition were added 50 parts of castor oil (hydroxyl value: 160 mgKOH/g), 50 parts of an adduct of aniline and 3 moles of propylene oxide (hydroxyl value: 420 mgKOH/g), 74 parts of mica powder and 5 parts of synthetic zeolite, and they were uniformly admixed. The NCO/OH equivalent ratio of the thus obtained anti-corrosive polyurethane coating composition was 1.05.

The coating composition was applied to a shot blasted steel pipe treated with a primer, and after aging at room temperature for 7 days, it was subjected to a test.

The results are shown in Table 1.

The water absorption was measured according to Japanese Industrial Standard (JIS) K 6911, and the impact resistance and flexibility were measured according to JIS K 5664.

TABLE 1

| | |
|---|---|
| Shore D hardness | 55 |
| Water absorption (%) | 1.6 |
| Volume resistivity ($\Omega \cdot m^2$) | |
| Initial | $5.8 \times 10^{14}$ |
| After dipping in water for 30 days | $1.2 \times 10^{14}$ |
| Impact resistance | No cracking and no peeling off |
| Flexibility | Endurable to round rod of 5 mm in diameter |

EXAMPLES 2 AND 3 AND COMPARATIVE EXAMPLES 1 TO 4

To 100 parts of the polyol mixture shown in Table 2 were added 30 parts of coal tar, 30 parts of carbon, 30 parts of mica, 2.5 parts of synthetic zeolite and 0.2 part of dibutyl tin dilaurate, and they were uniformly admixed to give a polyol composition (B).

Crude MDI was used as a polyisocyanate composition (A), and it was admixed with the composition (B) to form an anti-corrosive coating composition.

The coating composition was coated to form a film having a thickness of about 2.0 mm. After aging the film at room temperature for 7 days, the hardness of the film was measured (initial hardness). Also, with respect to the film dipped in a 10% aqueous solution of NaOH at 80° C. for 14 days, the hardness was measured.

The coating composition was applied in a thickness of about 1.5 mm to a shot blasted steel plate, and after aging at room temperature for 7 days, the physical properties of the film were measured by a testing method for tar epoxy resin paints provided in JIS K 5664.

The results are shown in Table 2.

In Table 2, the water absorption was measured according to JIS K 6911. Also, the adhesion property was estimated by cross-cutting a film, dipping in a 3% aqueous solution of sodium chloride at 50° C. for 1 month and observing peeling off of the film.

It is observed in Table 2 that the films formed from the anti-corrosive coating composition of the present invention show little change in hardness even if dipped in a 10% aqueous NaOH solution at 80° C. for 14 days, and have a very low water absorption and excellent adhesion property. It would be understood that the coating composition of the invention has an excellent anti-corrosive property. It is also observed in Table 2 that the films of Comparative Examples show a large change in hardness and a very large water absorption, and peeling off of the films occurs in the adhesion test, thus it would be understood that the anti-corrosive property is bad.

EXAMPLE 4

To 100 parts of castor oil fatty acid monoglyceride (hydroxyl value: 127 mgKOH/g) was added 172 parts of liquid MDI. The reaction was conducted at 90° C. for 1.5 hours in a nitrogen stream, and 10 parts of xylene was added to the reaction mixture to form a prepolymer composition. The viscosity of the prepolymer composition was 5,000 cP at 25° C., and 15% of the NCO groups of MDI remained as free NCO groups.

To the prepolymer composition were added 60 parts of castor oil (hydroxyl value: 160 mgKOH/g), 40 parts of an adduct of ethylenediamine and 4 moles of propylene oxide (hydroxyl value: 757 mgKOH/g), 74 parts of mica powder and 5 parts of synthetic zeolite, and they were uniformly admixed. The NCO/OH equivalent ratio of the thus obtained anti-corrosive polyurethane coating composition was 1.05.

The coating composition was applied to a shot blasted steel pipe treated with a primer, and after aging at room temperature for 7 days, the physical properties of the film was measured in the same manner as in Example 1.

The results are shown in Table 3.

TABLE 2

|  | Ex. 2 | Ex. 3 | Com. Ex. 1 | Com. Ex. 2 | Com. Ex. 3 | Com. Ex. 4 |
|---|---|---|---|---|---|---|
| Amine polyol |  |  |  |  |  |  |
| Benzylamine-butylene oxide adduct (OH value 220 mgKOH/g) | — | 20.0 | — | — | — | — |
| Aniline-propylene oxide adduct (OH value 480 mgKOH/g) | 40.0 | — | — | — | — | 43.6 |
| Castor oil polyol |  |  |  |  |  |  |
| Castor oil (OH value 160 mgKOH/g) | 60.0 | — | 100 | — | — | — |
| Castor oil fatty acid diglyceride (OH value 190 mgKOH/g) | — | 80.0 | — | 80.0 | 60.0 | — |
| Other polyols |  |  |  |  |  |  |
| Dipropylene glycol (OH value 280 mgKOH/g) | — | — | — | 20.0 | — | — |
| Glycerol-propylene oxide adduct (OH value 140 mgKOH/g) | — | — | — | — | 40.0 | 56.4 |
| Amount of MDI (A) (part) | 73.8 | 50.3 | 41.0 | 53.0 | 43.6 | 70.0 |
| (A)/(B) weight ratio | 2.61/1 | 3.83/1 | 4.70/1 | 3.64/1 | 4.42/1 | 2.75/1 |
| Shore D hardness |  |  |  |  |  |  |
| Initial | 70 | 65 | 31 | 30 | 37 | 63 |
| After dipping | 67 | 63 | 22 | 15 | 19 | 33 |
| Water absorption (%) | +1.4 | +1.5 | +4.9 | +7.1 | +6.7 | +10.3 |
| Flexibility | O | O | O | O | O | O |
| Impact resistance | O | O | O | O | O | O |
| Alkali resistance | O | O | O | O | O | O |
| Acid resistance | O | O | O | O | O | O |
| Appearance after 3 cycles of cooling and heating (−20° C. and 80° C.) | O | O | O | O | O | O |
| Moisture resistance | O | O | O | O | O | O |
| Salt spray test | O | O | X | X | X | O |
| Gasoline resistance | O | O | O | O | O | O |
| Adhesion | good | good | peeling | peeling | peeling | peeling |

(Note)
O: pass
X: failure

TABLE 3

| Shore D hardness | 60 |
|---|---|
| Water absorption (%) | 1.2 |

TABLE 3-continued

| Volume resistivity ($\Omega \cdot m^2$) | |
|---|---|
| Initial | $2 \times 10^{13}$ |
| After dipping in water for 30 days | $1 \times 10^{13}$ |
| Impact resistance | No cracking and no peeling off |
| Flexibility | Endurable to round rod of 5 mm in diameter |

EXAMPLES 5 AND 6 AND COMPARATIVE EXAMPLE 5

The procedures of Examples 2 and 3 were repeated except that the polyol mixtures shown in Table 4 was employed.

The results are shown in Table 4.

TABLE 4

| | Ex. 5 | Ex. 6 | Com. Ex. 5 |
|---|---|---|---|
| Amine polyol | | | |
| Ethylenediamine-butylene oxide adduct (hydroxyl value 280 mgKOH/g) | — | 20.0 | — |
| Ammonia-propylene oxide adduct (hydroxyl value 477 mgKOH/g) | 40.0 | — | 43.6 |
| Castor oil polyol | | | |
| Castor oil (hydroxyl value 160 mgKOH/g) | 60.0 | — | — |
| Castor oil fatty acid diglyceride (hydroxyl value 190 mgKOH/g) | — | 80.0 | — |
| Other polyols | | | |
| Glycerol-propylene oxide adduct (hydroxyl value 140 mgKOH/g) | — | — | 56.4 |
| Amount of MDI (A) (part) | 70.0 | 53.0 | 70.0 |
| (A)/(B) weight ratio | 2.75/1 | 3.64/1 | 2.75/1 |
| Shore D hardness | | | |
| Initial | 68 | 65 | 61 |
| After dipping in 10% NaOH soln. at 80° C. for 14 days | 67 | 62 | 32 |
| Water absorption (%) | +1.2 | +1.5 | +10.3 |
| Flexibility | O | O | O |
| Impact resistance | O | O | O |
| Alkali resistance | O | O | O |
| Acid resistance | O | O | O |
| Appearance after 3 cycles of cooling and heating (−20° C. and 80° C.) | O | O | O |
| Moisture resistance | O | O | O |
| Salt spray test | O | O | O |
| Gasoline resistance | O | O | O |
| Adhesion | good | good | peeling |

(Note)
O: pass
X: failure

It is observed in Table 4 that the films formed from the coating composition of the present invention show little change in hardness even if dipped in an aqueous alkali solution at an elevated temperature, and also, the water absorption is very low and the adhesion to metals is very good.

EXAMPLE 7

To 100 parts of castor oil fatty acid monoglyceride (hydroxyl value: 127 mgKOH/g) was added 172 parts of liquid MDI. The reaction was conducted at 90° C. for 1.5 hours in a nitrogen stream, and 10 parts of an aromatic process oil was added to the reaction mixture to form a prepolymer composition. The viscosity of the prepolymer composition was 7,000 cP at 25° C., and 15% of the NCO groups of MDI remained as free NCO groups.

To 152 parts of the prepolymer composition were added 50 parts of castor oil (hydroxyl value: 160 mgKOH/g), 50 parts of an adduct of aniline and 3 moles of propylene oxide (hydroxyl value: 420 mgKOH/g), 74 parts of mica powder and 5 parts of synthetic zeolite, and they were uniformly admixed. The NCO/OH equivalent ratio of the thus obtained anti-corrosive polyurethane coating composition was 1.05. The weighted average hydroxyl value of the polyols was 231.6 mgKOH/g.

The coating composition was applied to a shot blasted steel pipe treated with a primer, and after aging at room temperature for 7 days, the physical properties of the film was measured in the same manner as in Example 1.

The results are shown in Table 5.

TABLE 5

| Shore D hardness | 50 |
|---|---|
| Water absorption (%) | 1.6 |
| Volume resistivity ($\Omega \cdot m^2$) | |
| Initial | $5.1 \times 10^{14}$ |
| After dipping in water for 30 days | $1.0 \times 10^{14}$ |
| Impact resistance | No cracking and no peeling off |
| Flexibility | Endurable to round rod of 5 mm in diameter |

EXAMPLES 8 TO 10 AND COMPARATIVE EXAMPLE 6

The procedures of Examples 2 and 3 were repeated except that the polyol mixture shown in Table 6 was employed as a polyol and an aromatic hydrocarbon resin (commercial name "Fukkol Resin FRL" made by Fujikosan Kabushiki Kaisha) was employed instead of coal tar. In Comparative Example 6, the use of the aromatic hydrocarbon resin was omitted.

The results are shown in Table 6.

TABLE 6

| | Ex. 8 | Ex. 9 | Ex. 10 | Com. Ex. 6 |
|---|---|---|---|---|
| Amine polyol | | | | |
| Ethylenediamine-butylene oxide adduct (OH value 280 mgKOH/g) | — | — | 20.0 | — |
| Ammonia-propylene oxide adduct (OH value 477 mgKOH/g) | 40.0 | — | — | — |
| Aniline-propylene oxide adduct (OH value 420 mgKOH/g) | — | 30.0 | — | — |
| Castor oil polyol | | | | |
| Castor oil (OH value 160 mgKOH/g) | 60.0 | 70.0 | — | 60.0 |
| Castor oil fatty acid diglyceride (OH value 190 mgKOH/g) | — | — | 80.0 | — |
| Other polyols | | | | |
| Glycerol-propylene oxide adduct | — | — | — | 40.0 |

TABLE 6-continued

|  | Ex. 8 | Ex. 9 | Ex. 10 | Com. Ex. 6 |
|---|---|---|---|---|
| (OH value 140 mgKOH/g) |  |  |  |  |
| Amount of MDI (A) (part) | 70.0 | 61.0 | 53.0 | 39.0 |
| (A)/(B) weight ratio | 2.75/1 | 3.16/1 | 3.64/1 | 4.94/1 |
| Shore D hardness |  |  |  |  |
| Initial | 68 | 70 | 65 | 29 |
| After dipping in 10% NaOH soln. at 80° C. for 14 days | 67 | 70 | 62 | 14 |
| Water absorption (%) | +1.2 | +0.9 | +1.5 | +10.7 |
| Flexibility | O | O | O | O |
| Impact resistance | O | O | O | O |
| Alkali resistance | O | O | O | O |
| Acid resistance | O | O | O | O |
| Appearance after 3 cycles of cooling and heating (−20° C. and 80° C.) | O | O | O | O |
| Moisture resistance | O | O | O | O |
| Salt spray test | O | O | O | X |
| Gasoline resistance | O | O | O | O |
| Adhesion | good | good | good | peeling |

(Note)
O: pass
X: failure

EXAMPLES 11 TO 13 AND COMPARATIVE EXAMPLES 7 TO 9

Each of the anti-corrosive polyurethane coating compositions prepared in Examples 1, 4 and 7 was applied in thickness of 1.5 mm to a steel pipe (inner diameter: 1 m), and was aged at room temperature for 7 days.

For comparison, the following test specimens were also prepared. An asphalt primer was applied to the same steel pipe as above, and thereon molten asphalt was then applied in thickness of 5 mm (Comparative Example 7). A coal tar primer was applied to the same pipe as above, and molten coal tar was then applied in thickness of 5 mm (Comparative Example 8). A coal tar primer was applied to the same pipe as above, and a commercially available tar epoxy resin paint was then applied in thickness of 1,500 μm (wet) and dried (Comparative Example 9).

By employing the thus prepared specimens, the impact resistance were measured according to JIS G 3492. The results are shown in Table 7.

TABLE 7

| Anticorrosive paint | Impact resistance | |
|---|---|---|
|  | at −5° C. | at −30° C. |
| Example 1 | 0.7 | 0.9 |
| Example 4 | 0.5 | 0.7 |
| Example 7 | 0.5 | 0.9 |
| Com. Ex. 7 | 18 | >65 |
| Com. Ex. 8 | 35 | >65 |
| Com. Ex. 9 | 3.1 | 4.5 |

It is observed in Table 7 that the anti-corrosive coating compositions of the present invention have an excellent impact resistance.

In addition to the ingredients used in the Examples, other ingredients can be used in the Examples as set forth in the specification to obtain substantially the same results.

What we claim is:

1. An anti-corrosive coating composition consisting essentially of a non-foamed reaction product of:
   (1) a mixture of (a) a castor oil polyol and (b) an amine polyol produced by addition reaction of an alkylene oxide of the formula:

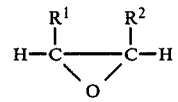

wherein $R^1$ and $R^2$ are hydrogen, alkyl or aryl, provided that at least one of $R^1$ and $R^2$ is hydrogen,
   to a nitrogen-containing compound having at least 2 active hydrogen atoms, said amine polyol having at least 2 hydroxyl groups and a hydroxyl value of at least 150 mgKOH/g, the amount of said amine polyol being 5 to 70% by equivalent based on the total polyol; and
   (2) a polyisocyanate compound, the amount of said polyisocyanate compound being such that the ratio of isocyanato group to the active hydrogen of the polyol is from 0.85 to 1.15:1 by equivalent.

2. The composition of claim 1, wherein the weighted average hydroxyl value of said polyol mixture is at least 180 mgKOH/g.

3. The composition of claim 1, which further contains a coal tar.

4. The composition of claim 1, which further contains at least one member selected from the group consisting of an aromatic hydrocarbon oil and an aromatic hydrocarbon resin.

* * * * *